United States Patent
Hutchinson et al.

(10) Patent No.: US 10,410,660 B1
(45) Date of Patent: Sep. 10, 2019

(54) SPLIT CONTACT SENSOR FOR A HEAT-ASSISTED MAGNETIC RECORDING SLIDER

(71) Applicant: Seagate Technology LLC, Cupertino, CA (US)

(72) Inventors: Erik Jon Hutchinson, Eden Prairie, MN (US); Declan Macken, Eden Prairie, MN (US); Manuel Charles Anaya-Dufresne, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/134,021

(22) Filed: Sep. 18, 2018

(51) Int. Cl.
| | |
|---|---|
| *G11B 11/105* | (2006.01) |
| *G11B 5/31* | (2006.01) |
| *G11B 5/48* | (2006.01) |
| *G11B 5/60* | (2006.01) |
| *G11B 5/00* | (2006.01) |

(52) U.S. Cl.
CPC ............ *G11B 5/3169* (2013.01); *G11B 5/314* (2013.01); *G11B 5/4813* (2013.01); *G11B 5/4826* (2013.01); *G11B 5/4866* (2013.01); *G11B 5/6082* (2013.01); *G11B 2005/0021* (2013.01)

(58) Field of Classification Search
None
See application file for complete search history.

(56) References Cited

U.S. PATENT DOCUMENTS

| | | |
|---|---|---|
| 7,095,577 B1 | 8/2006 | Codilian et al. |
| 7,928,386 B2 | 4/2011 | Frey et al. |
| 8,705,323 B2 | 4/2014 | Contreras et al. |
| 8,810,947 B1 | 8/2014 | Ren et al. |
| 8,811,127 B1* | 8/2014 | Hirata ................ G11B 5/3133 369/13.13 |
| 8,824,085 B2 | 9/2014 | Wilson et al. |
| 8,842,507 B1 | 9/2014 | Hirano et al. |
| 8,879,189 B2 | 11/2014 | Miyamoto et al. |
| 8,908,483 B1 | 12/2014 | Ren et al. |
| 9,030,773 B2 | 5/2015 | Macken et al. |
| 9,042,207 B2 | 5/2015 | Dakroub |
| 9,042,210 B2 | 5/2015 | Macken |
| 9,047,926 B2 | 6/2015 | Contreras et al. |
| 9,153,272 B1 | 10/2015 | Rausch et al. |

(Continued)

OTHER PUBLICATIONS

U.S. Appl. No. 15/956,044, filed Apr. 18, 2018.

*Primary Examiner* — Tan X Dinh
(74) *Attorney, Agent, or Firm* — Hollingsworth Davis, LLC

(57) ABSTRACT

An apparatus comprises a slider having an air bearing surface (ABS), a leading edge, and a trailing edge opposing the leading edge. A writer having a write pole is situated at or near the ABS. A near-field transducer (NFT) is situated at or near the ABS and between the write pole and the leading edge of the slider. An optical waveguide is configured to couple light from a laser source to the NFT. A contact sensor is situated between the write pole and the trailing edge. The contact sensor comprises a first ABS section situated at or near the ABS, a second ABS section situated at or near the ABS and spaced apart from the first ABS in a cross-track direction by a gap, and a distal section extending away from the ABS and connecting the first ABS section with the second ABS section.

20 Claims, 10 Drawing Sheets

(56) References Cited

U.S. PATENT DOCUMENTS

| | | |
|---|---|---|
| 9,177,577 B2 | 11/2015 | Macken et al. |
| 9,202,499 B2 | 12/2015 | Kiely et al. |
| 9,202,500 B2 | 12/2015 | Kunkel et al. |
| 9,214,173 B2 | 12/2015 | Kunkel et al. |
| 9,236,081 B1 | 1/2016 | Chu et al. |
| 9,502,061 B1 | 11/2016 | Zhu et al. |
| 9,536,555 B1* | 1/2017 | Duda .................... G11B 5/6076 |
| 9,558,774 B1 | 1/2017 | Macken |
| 9,595,288 B1 | 3/2017 | Chu et al. |
| 9,601,140 B1 | 3/2017 | Rajauria |
| 9,620,163 B1 | 4/2017 | Zheng et al. |
| 9,685,182 B1* | 6/2017 | Granz .................... G11B 5/607 |
| 9,704,529 B1 | 7/2017 | Lou et al. |
| 9,741,375 B2 | 8/2017 | Kunkel et al. |
| 9,747,937 B1 | 8/2017 | Duda et al. |
| 9,799,358 B2 | 10/2017 | Kiely et al. |
| 9,799,361 B1 | 10/2017 | Duda et al. |
| 9,824,705 B1 | 11/2017 | Macken et al. |
| 9,858,953 B1 | 1/2018 | Johnson |
| 9,875,764 B1 | 1/2018 | Riddering |
| 9,875,767 B2 | 1/2018 | Duda et al. |
| 9,881,642 B2 | 1/2018 | Zhang et al. |
| 9,916,847 B1 | 3/2018 | Granz et al. |
| 9,916,851 B1 | 3/2018 | Seigler et al. |
| 9,928,873 B1 | 3/2018 | Liu et al. |
| 9,959,893 B1 | 5/2018 | Duda et al. |
| 9,972,350 B1 | 5/2018 | Macken et al. |
| 10,056,101 B1 | 8/2018 | Wessel |
| 10,147,454 B1* | 12/2018 | Mendonsa .............. G11B 5/455 |
| 2011/0299367 A1 | 12/2011 | Naniwa et al. |
| 2012/0051196 A1 | 3/2012 | Grobis et al. |
| 2013/0077453 A1 | 3/2013 | Alex |
| 2013/0286511 A1* | 10/2013 | Edelman .................. G11B 5/29 360/234.3 |
| 2013/0286802 A1 | 10/2013 | Kiely |
| 2014/0119164 A1 | 5/2014 | Wilson et al. |
| 2014/0269238 A1 | 9/2014 | Kautzky et al. |
| 2015/0003222 A1* | 1/2015 | Dakroub .............. G11B 5/6005 369/13.33 |
| 2015/0036469 A1 | 2/2015 | Johnson et al. |
| 2015/0162022 A1* | 6/2015 | Peng .................... G11B 5/3945 360/66 |
| 2015/0279430 A1 | 10/2015 | Trantham |
| 2016/0104514 A1 | 4/2016 | Burnett et al. |
| 2016/0284372 A1 | 9/2016 | Duda et al. |
| 2017/0032810 A1 | 2/2017 | Macken |
| 2017/0370770 A1 | 12/2017 | Kiely et al. |

* cited by examiner

FIGURE 6A
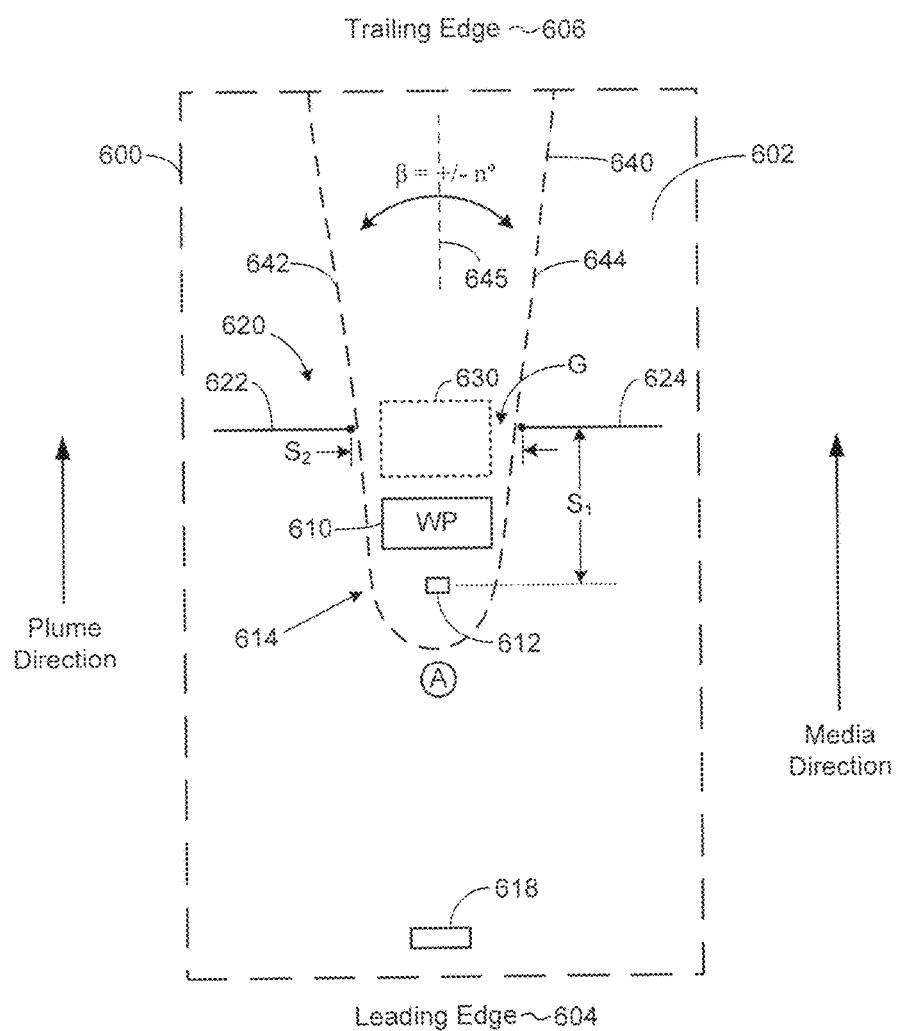
FIGURE 6B
FIGURE 6C
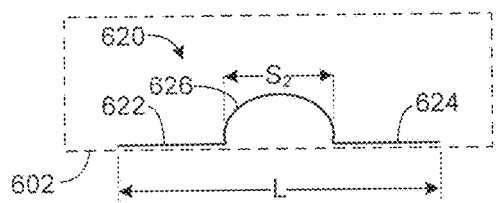

SPLIT CONTACT SENSOR FOR A HEAT-ASSISTED MAGNETIC RECORDING SLIDER

SUMMARY

Embodiments are directed to an apparatus comprising a slider having an air bearing surface (ABS), a leading edge, and a trailing edge opposing the leading edge. A writer having a write pole is situated at or near the ABS. A near-field transducer (NFT) is situated at or near the ABS and between the write pole and the leading edge of the slider. An optical waveguide is configured to couple light from a laser source to the NFT. A contact sensor is situated between the write pole and the trailing edge. The contact sensor comprises a first ABS section situated at or near the ABS, a second ABS section situated at or near the ABS and spaced apart from the first ABS in a cross-track direction by a gap, and a distal section extending away from the ABS and connecting the first ABS section with the second ABS section.

Embodiments are directed to an apparatus comprising a slider having an ABS, a leading edge, and a trailing edge opposing the leading edge. A writer having a write pole is situated at or near the ABS. An NFT is situated at or near the ABS and between the write pole and the leading edge of the slider. An optical waveguide is configured to couple light from a laser source to the NFT. A contaminant buildup region fans out from the NFT in a cross-track direction along the ABS, past the write pole, and towards the trailing edge of the slider. A contact sensor is situated between the write pole and the trailing edge. The contact sensor comprises a first ABS section situated at or near the ABS, a second ABS section situated at or near the ABS and spaced apart from the first ABS in a cross-track direction by a gap, and a distal section extending away from the ABS and connecting the first ABS section with the second ABS section. The gap is sufficient in size such that the first and second ABS sections are outside of the contaminant buildup region.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 6A is a schematic of various components of a HAMR slider, including a split contact sensor, situated at or proximate an ABS of the slider in accordance with various embodiments;

FIG. 6B is a cross-sectional view of the split contact sensor shown in FIG. 6A;

FIG. 6C shows a dielectric material disposed between a section of the split contact sensor of FIGS. 6A and 6B and a structure of the slider in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk to near or above the Curie temperature during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

Figure 1:
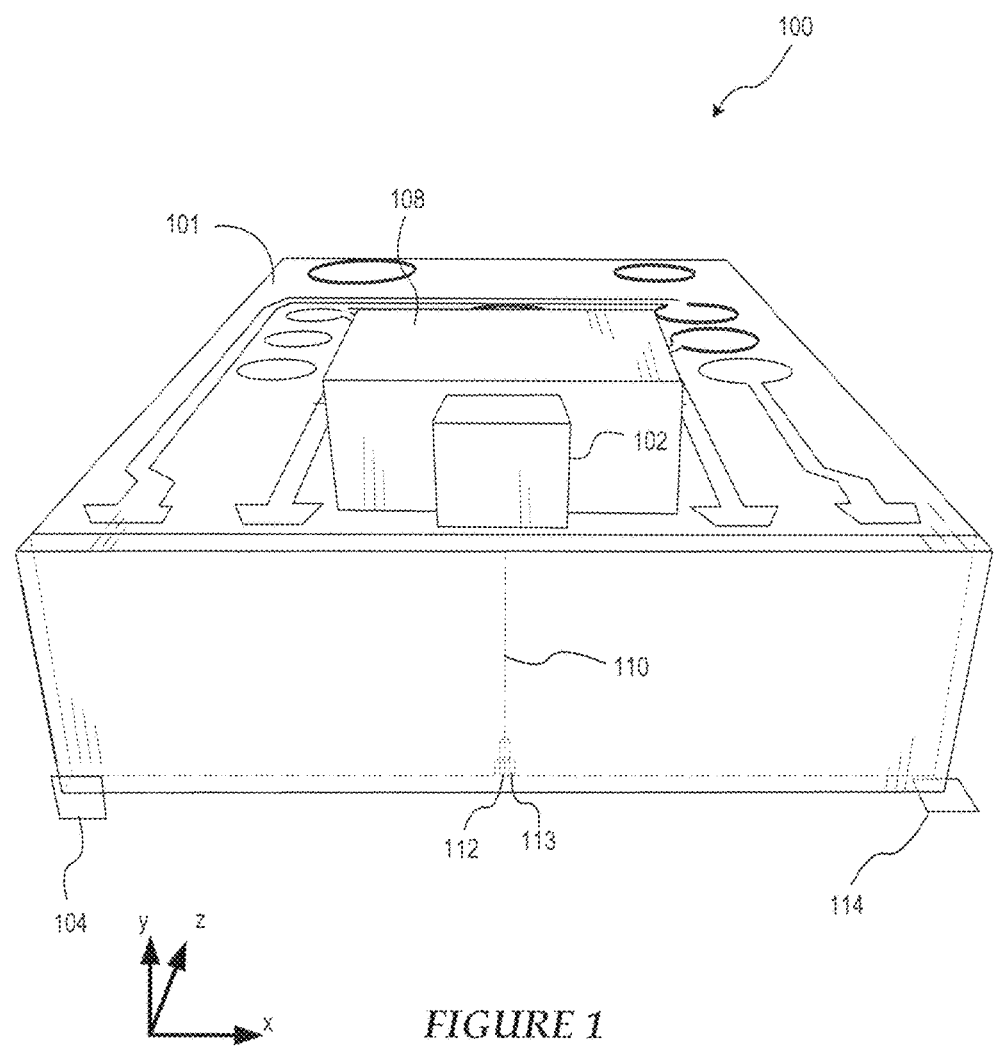
FIG. 1 is a perspective view of a HAMR slider with which various embodiments disclosed herein may be implemented.
Figure 2:
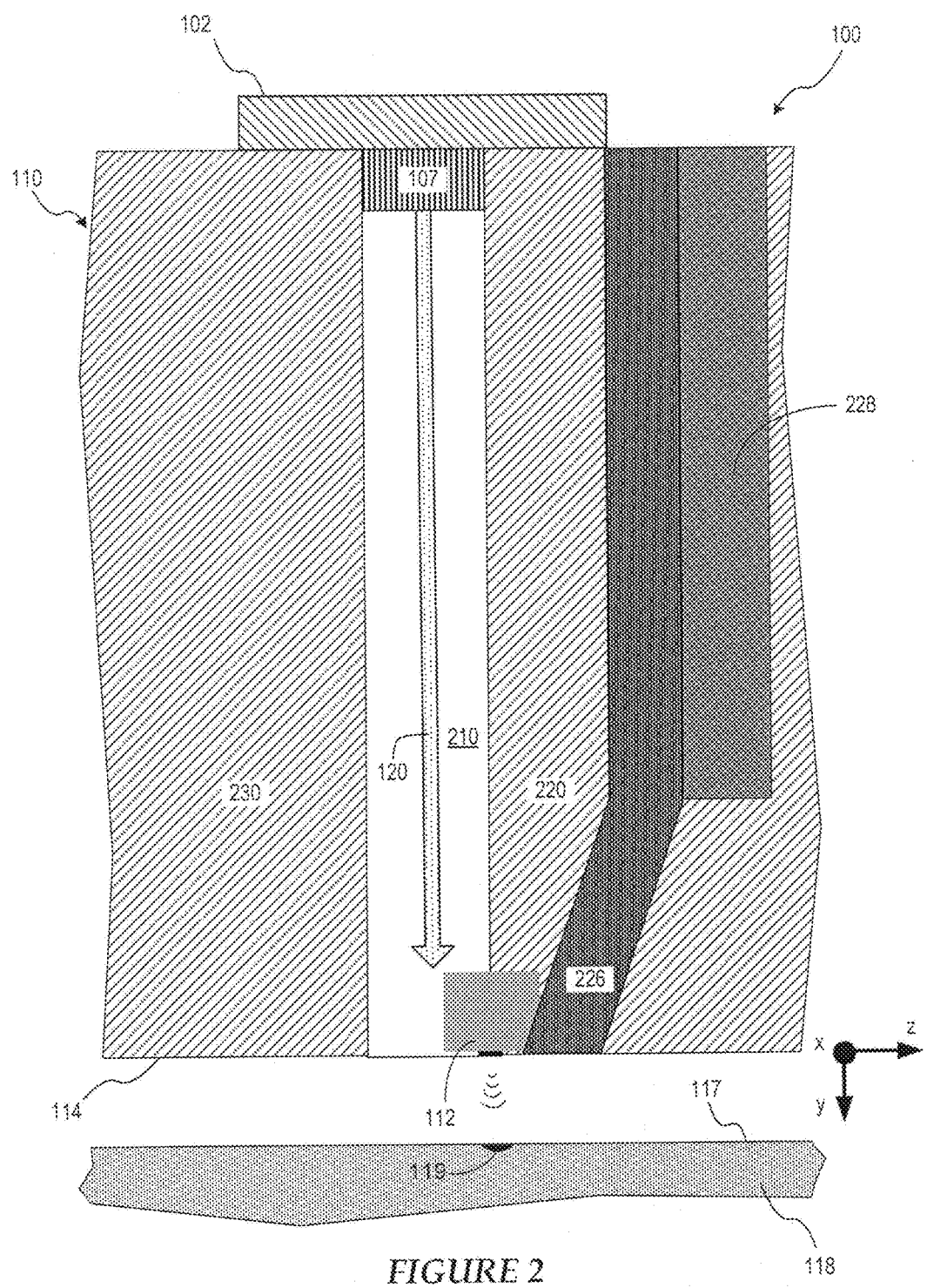
FIG. 2 is a cross-sectional view of a HAMR slider with which various embodiments disclosed herein may be implemented.

Embodiments of a HAMR head 100 that can incorporate a split contact sensor of the present disclosure are illustrated in FIGS. 1 and 2. As shown, the head 100 (also referred to as a slider) includes a light source (e.g., a laser diode) 102 located proximate a trailing edge surface 104 of the slider body 101. An optical wave (e.g., a laser beam) 120 generated by the light source 102 is delivered to an NFT 112 via an optical waveguide 110. The NFT 112 is aligned with a plane of an air bearing surface (ABS) 114 of the head 100, and one edge of a read/write head 113 is on the ABS 114. The read/write head 113 includes at least one writer and at least one reader. In some embodiments, multiple writers (e.g., 2 writers) and multiple readers (e.g., 3 readers) can be incorporated into the read/write head 113. The ABS 114 faces, and is held proximate to, a surface 117 of a magnetic medium 118 during device operation. The ABS 114 is also referred to as a media-facing surface.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the head 100, such as the trailing edge surface 104. While the representative embodiments of FIGS. 1 and 2 show the waveguide 110 integrated with the head 100, any type of light delivery configuration may be used. As shown in FIG. 1, the laser diode 102 is shown coupled to the slider body 101 via a submount 108. The submount 108 can be used to orient and affix an edge-emitting laser diode 102 so that its output is directed downwards (negative y-direction in the figure). An input surface of the slider body 101 may include a grating, and optical coupler or other coupling features to receive light from the laser diode 102.

When writing with a HAMR device, electromagnetic energy is concentrated onto a small hotspot 119 over the track of the magnetic medium 118 where writing takes place, as is shown in the embodiment of FIG. 2. The light from the light source 102 propagates to the NFT 112, e.g., either directly from the light source 102 or through a mode converter or by way of a focusing element. FIG. 2, for example, shows an optical coupler 107 adjacent the light source 102, which is configured to couple light produced from the light source 102 to the waveguide 110.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 119 is on the order of 50 nm or less. Thus, the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material on a substrate. In a HAMR head 100, the NFT 112 is positioned proximate a write pole 226 of the read/write head 113. A yoke 228 is positioned adjacent to, and magnetically couples with, the writer pole 226. The NFT 112 is aligned with the plane of the ABS 114 parallel to the surface 117 of the magnetic medium 118. The waveguide 110 and optional mode converter and/or other optical element directs electromagnetic energy 120 (e.g., laser light) onto the NFT 112. The NFT 112 achieves surface plasmon resonance in response to the incident electromagnetic energy 120. The plasmons generated by this resonance are emitted from the NFT 112 towards the magnetic medium 118 where they are absorbed to create a hotspot 119. At resonance, a high electric field surrounds the NFT 112 due to the collective oscillations of electrons at the metal surface (e.g., substrate) of the magnetic medium 118. At least a portion of the electric field surrounding the NFT 112 gets absorbed by the magnetic medium 118, thereby raising the temperature of a spot 119 on the medium 118 as data is being recorded.

The waveguide 110 shown in FIG. 2 includes a layer of core material 210 surrounded by first and second cladding layers 220 and 230. The first cladding layer 220, also referred to as a top cladding layer, is shown proximate the NFT 112 and the write pole 226. The second cladding layer 230, also referred to as a bottom cladding layer, is spaced away from the first cladding layer 220 and separated therefrom by the waveguide core 210. The core layer 210 and cladding layers 220 and 230 may be fabricated from dielectric materials, such as optical grade amorphous material with low thermal conductivities. The first and second cladding layers 220 and 230 may each be made of the same or a different material. The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

As was previously discussed, laser light produced by the laser 220 is coupled to the NFT 112 via the waveguide 222. The NFT 112, in response to the incident laser light, generates a high power density in a near-field region that is directed to the magnetic storage medium 118. This high power density in a near-field region of the NFT 112 causes an increase in local temperature of the medium 118, thereby reducing the coercivity of the magnetic material for writing or erasing information to/at the local region of the medium 118. A portion of the laser light energy communicated to the NFT 112 is absorbed and converted to heat within the slider 100. This heating results in thermal expansion of the ABS materials, protrusion at the ABS 114, and a change in both head-media clearance and head-media separation. In addition to the NFT 112, the slider 100 typically includes additional heat sources that can cause further thermal expansion and protrusion of the ABS 114. Such additional heat sources, when active, include one or more of the write pole 226 (and writer coil), writer heater, and reader heater.

Figure 3:
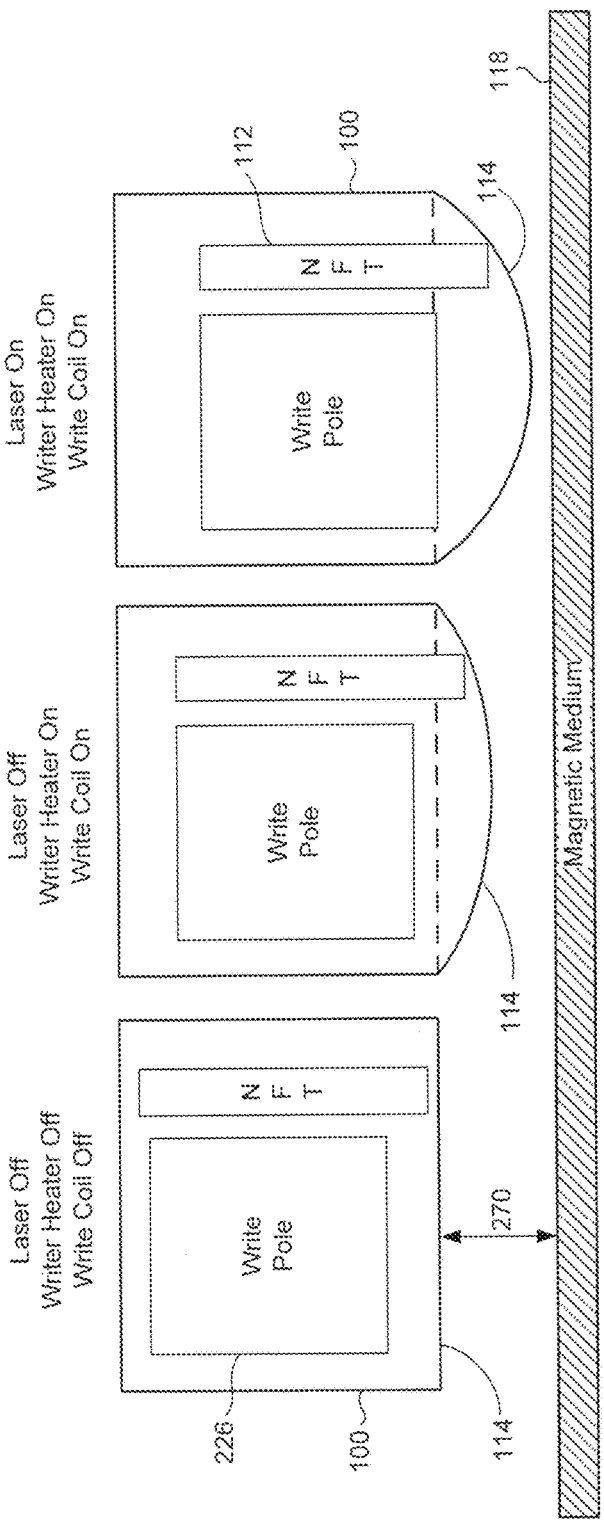
FIGS. 3A-3C are simplified side views of a writer portion of the HAMR slider illustrated in FIGS. 1 and 2.

FIGS. 3A-3C are simplified side views of an NFT/write pole region of the slider 100 illustrated in FIGS. 1 and 2. The portion of the slider 100 shown in FIGS. 3A-3C includes the write pole 226, NFT 112, and a portion of the ABS 114. FIGS. 3A-3C show general protrusion progression of a portion of the slider ABS 114 in response to activation of different heat sources within the slider 100. These different heat sources include the write coil of the writer, the writer heater, and the laser which produces the optical energy converted to heat by the NFT 112.

In FIG. 3A, the slider 100 is shown in a non-thermally actuated state. In this state, the laser, writer heater, and writer coil of the writer are all off. Thus, the slider 100 attains a default, non-actuated shape/state establishing a default distance between the ABS 114 of the slider 100 and the surface of the magnetic storage medium 118. This default distance is illustrated by an air gap 270.

FIG. 3B illustrates the slider 100 in a partial-thermally actuated state, which is not a typical operational state but is shown for illustrative purposes. In this state, the writer heater and the writer coil of the writer are on, but the laser is off. In response to activation of the writer heat sources (write pole 226, return pole) and writer heater, the ABS 114 at and surrounding the NFT/write pole region of the slider 100 protrudes into the air gap 270. Thus, the air gap 270 and the distance between ABS 114 and the medium surface 118 decreases. The dashed line in FIG. 3B indicates the default state/shape of ABS 114 depicted in FIG. 3A.

The magnitude of ABS protrusion of the slider 100 is furthered increased by the additional activation of the laser, as shown in FIG. 3C. The additional heat produced by the NFT 112 in response to the incident laser light further expands the ABS 114, causing the ABS 114 to protrude further into air gap 270. It can be seen in FIGS. 3A-3C that the stroke, or magnitude, of the ABS protrusion of the slider 100 changes in size and shape with introduction and removal of heat to/from the ABS 114.

Figure 4:
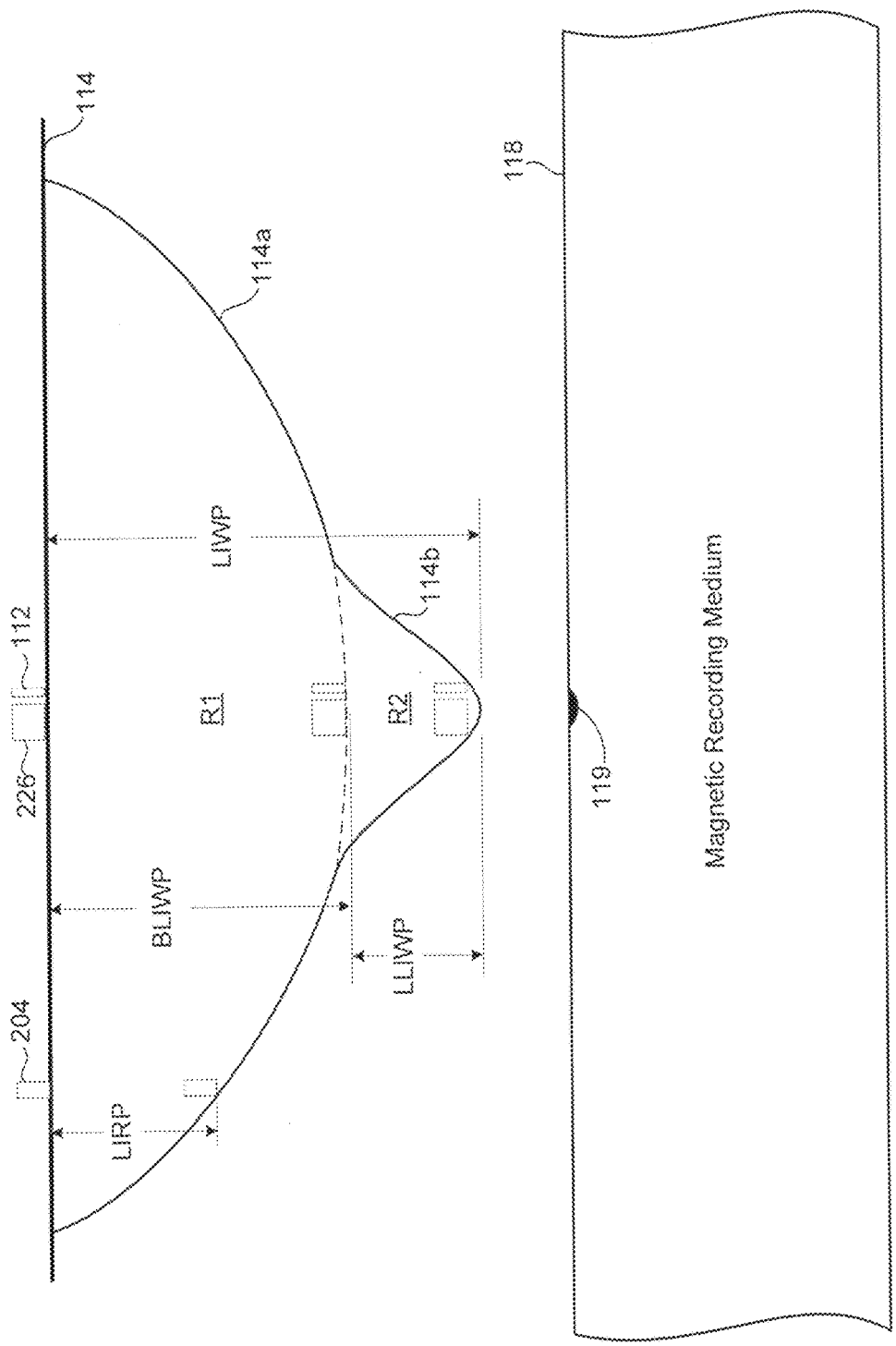
FIG. 4 is an exaggerated illustration of a laser-induced protrusion developed at the ABS of a HAMR slider in accordance with various embodiments.

FIG. 4 is an exaggerated illustration of a laser-induced protrusion developed at the ABS 114 of a HAMR slider 100 in accordance with various embodiments. More particularly, the protrusion of the slider ABS 114 shown in FIG. 4 is referred to herein as Laser-induced Writer Protrusion (LIWP). As a shown in FIG. 4, the region of LIWP encompasses a write pole 226 (e.g., write pole) and an NFT 112 of the slider. LIWP represents the full excursion of the protrusion developed at the ABS 114 due to heating of the NFT 112 by excitation of the laser and other heat sources (e.g., the write pole 226 and writer heater). The reader 204 can also be subject to displacement by the ABS protrusion resulting from excitation of the laser of the slider. Protrusion of the slider ABS 114 due to laser/NFT heating in the region that encompasses the reader 204 is referred to herein as Laser-induced Reader Protrusion (LIRP). Because the reader 204 is situated away from the NFT 112/write pole 226, allowing for dissipation of laser-induced heat, LIRP is not as pronounced as LIWP. However, LIRP is quite noticeable and impacts reader performance. It is noted that the features shown in FIG. 4 are not drawn to scale.

LIWP is understood to include two protrusion components. The first component of LIWP is a broad protrusion component, referred to herein as Broad Laser-induced Writer Protrusion (BLIWP). As the term implies, a relatively broad region of the ABS 114 surrounding the write pole 226 and NFT 112 expands to form a protruded region (volume) R1 (114*a*) in response to the heat generated by the NFT 112 and the write pole 226 (and writer heater). The second component of LIWP is a local protrusion component, referred to herein as Local Laser-induced Writer Protrusion (LLIWP). LLIWP is a small and narrow protrusion (relative to the BLIWP) that extends from the BLIWP in a direction towards the surface of the magnetic recording medium 118. As can be seen in FIG. 4, the BLIWP component encompasses a significantly larger volume (in region R1 114*a*) of ABS material relative to that (in region R2 114*b*) of the LLIWP component. Evaluation of experimental sliders has revealed that LIWP typically ranges between about 2 and 4 nm, while LLIWP typically ranges between about 1 to 2 nm (<2 nm). It is understood that, although each of LIWP, BLIWP, LLIWP, and LIRP involves expansion of a volume of ABS material, these protrusion parameters are measured in terms of a distance (in nanometers) extending from the ABS 114 and along a plane normal to the ABS 114 in a direction towards the recording medium 118.

An important function of a hard disk drive (HDD) is to accurately set the clearance between the slider and the surface of the magnetic storage medium of the HDD in order to maintain the written bit size, and thus maintain areal bit density. Toward this end, various techniques have been developed to set clearance that involve incrementally reducing fly height of the slider until contact is made between the slider and the recording medium. Once contact is made, an appropriate clearance is set such that slider is made to fly close to, but spaced apart from, the surface of the medium during operation. It can be appreciated that for HAMR sliders, it is important to account for LIWP in order to avoid detrimental contact between the slider and the medium.

The writing process implemented by a HAMR device generates high temperatures at the ABS 114 proximate the NFT 112 and write pole 226, as well as the hotspot 119 on the magnetic medium 118. The elevated temperatures associated with HAMR device operation results in thermochemical reactions between the recording head arrangement and the magnetic medium 118. For example, elevated temperatures at the head-disk interface result in an increase of contaminants from a variety of sources, including the lubrication that coats the magnetic medium 118. Globules of lubrication and other contaminants can form at the head-disk interface, which tend to accumulate at or near locations of elevated temperature. Other contaminants that tend to accumulate at the head-disk interface include silica, iron, iron-platinum, nickel, asperities, and other materials that are used to fabricate the magnetic medium. Dust and other ambient debris can also accumulate at the head-disk interface.

Figure 5:
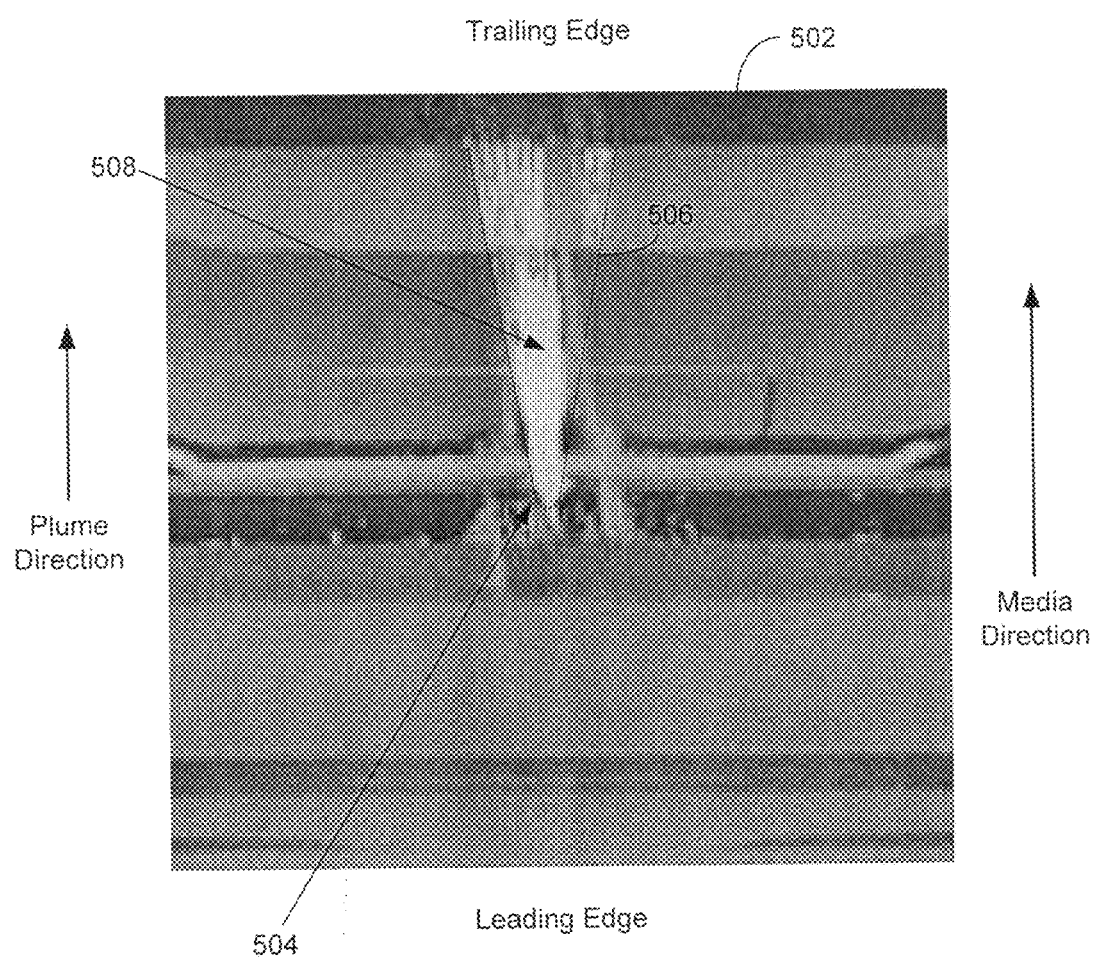
FIG. 5 is an AFM (Atomic Force Microscope) image of a HAMR slider showing a contaminant buildup region of the slider.

One problematic contaminant buildup region of the slider is located at and near the NFT 112 and the write pole 226 of the slider 100. As will be further discussed below, this contaminant buildup region fans out from the NFT in a cross-track direction along the ABS 114, extending from the NFT 112, past the write pole 226, and towards the trailing edge of the slider. FIG. 5 is an AFM image of a HAMR slider 502 showing this problematic contaminant buildup region 506 of the slider 502. This contaminant buildup region 506 is manifested as a contaminant plume 508 originating at or near the NFT/write pole region 504 of the slider 502, and fanning out in a cross-track direction towards the trailing edge of the slider 502.

A writer contact sensor is typically situated at or near a writer close point of the ABS in the vicinity of the NFT/write pole region 504. The writer contact sensor is used for setting writer clearance, sensing changes in slider fly height, and sensing contact between the slider and the magnetic medium. In addition to sensing head-to-medium contact events, the writer contact sensor can be configured to sense BLIWP and LLIWP. Because the writer contact sensor is typically situated within the contaminant buildup region 506 near the NFT/write pole region 504, contaminants can build up on the writer contact sensor. Contaminant buildup on the writer contact sensor can cause an early contact detect trigger, which leads to an incorrect zero reference being used as the writer clearance setting. Contaminant buildup on the writer contact sensor can also render the writer contact sensor insensitive to BLIWP and LLIWP. Although various cleaning techniques have been developed in an attempt to remove contaminants from the ABS of a slider, contaminant buildup on the ABS, including on the writer contact sensor, is a reoccurring problem that resumes upon completion of a cleaning technique.

FIG. 6A is a schematic of various components of a HAMR slider, including a split contact sensor, situated at or proximate an ABS of the slider in accordance with various embodiments. The schematic shown in FIG. 6A is a medium-facing view of the ABS 602 of the slider 600. The portion of the slider 600 shown in FIG. 6A includes a write pole 610 situated proximate an NFT 612. A reader 618 is positioned out of track of the NFT 612 in the direction of a leading edge 604 of the slider 600. It is understood that the schematic view of the ABS portion shown in FIG. 6A is not to scale.

A split contact sensor 620 is situated between the write pole 610 and a trailing edge 606 of the slider 600. In broad terms, one or more portions of the split contact sensor 620 is/are situated at or proximate the ABS 602, while one or more portions of the split contact sensor 620 is/are situated away from the ABS 602. The split contact sensor 620 shown in FIG. 6A includes a first ABS section 622 and a second ABS section 624, each of which is situated at or near (e.g., within about 300 nm) the ABS 602. The first ABS section 622 is spaced apart from the second ABS section 624 in a cross-track direction by a gap, G. As can be seen in the cross-sectional view of FIG. 6B, the first ABS section 622 is connected to the second ABS section 624 by a distal section 626. The distal section 626 of the split contact sensor 620 extends away from the ABS 602 and into the body of the slider 600 (e.g., in a direction into the page as is denoted by the solid circles on opposing ends of the first and second ABS sections 622, 624). More particularly, the first and second ABS sections 622, 624 are oriented along a first plane that is at or parallel with the ABS 602. One or both of the write pole 610 and the NFT 612 can also be oriented along the first plane. The distal section 626 of the split contact sensor 620 is oriented along a second plane oblique to the first plane. In some configurations, the first and second planes can be orthogonal to one another.

The portion of the ABS 602 shown in FIG. 6A includes a contaminant buildup region 640 that originates at or near an NFT/write pole region 614 of the ABS 602 and extends in a direction towards the trailing edge 606 of the slider 600. The contaminant buildup region 640 fans out in a cross-track direction as it extends from the NFT/write pole region 614 towards the trailing edge 606 of the slider 600. The contaminant buildup region 640 is a substantially V-shaped region defined by a vertex angle, β. A vertex of the V-shaped region 640 is situated at or proximate the NFT/write pole region 614, typically ahead of the NFT 612 (e.g., at or near location A). The vertex angle, β, is defined between lines 642 and 644 that originate at the vertex. Lines 642 and 644 define the periphery of the contaminant buildup region 640. Although lines 642, 644 are shown as generally straight lines, it is understood that the periphery of the contaminant buildup region 640 can be somewhat meandering. The magnitude of the vertex angle, β, is related to the skew angle of the slider 600 defined between extreme inner and outer diameter locations of the magnetic storage medium over which the slider 600 is positionable. In general, the vertex angle, β, can range between about +/−15° relative to longitudinal axis 645. For example, the vertex angle, β, can range from about 15° to about 30°. In accordance with a different perspective, the vertex angle, β, can be defined as an angle between the NFT 612 and opposing ends (denoted by solid circles) of the first and second ABS sections 622, 624, such that the vertex angle, β, ranges between about +/−15° relative to longitudinal axis 645 (e.g., from about 15° to about 30°).

As is shown in FIG. 6A, the split contact sensor 620 is positioned down track of the NFT/write pole region 614 between the write pole 610 and the trailing edge 606 of the slider 600. It is desirable to position the split contact sensor 620 in close proximity to the NFT/write pole region 614 in order to reliably detect contact between the slider 600 and a magnetic recording medium and, in some implementations, detect Laser-induced protrusion of the ABS 602. For example, in accordance with various embodiments, the split contact sensor 620 is positioned relative to the NFT/write pole region 614 in order to sense (a) head-to-medium contact, (b) BLIWP, and (c) LLIWP. It has been determined by the inventors that positioning the split contact sensor 620 downtrack of the NFT 612 in a direction towards the trailing edge 606 with a spacing, $S_1$, of about 0.8 μm to 2 μm facilitates sensing of head-to-medium contact, BLIWP, and LLIWP by the split contact sensor 620. It is noted that a split contact sensor 620 positioned ahead of the NFT 612, such as at location A shown in FIG. 6A, can provide sufficient detection of head-to-medium contact, but does not provide sufficient detection of BLIWP and LLIWP.

It was found that a traditional contact sensor positioned between the NFT 612 and the trailing edge 606 with a spacing, S1, described above accumulated contaminant buildup due to being positioned within the contaminant buildup region 640. As was discussed previously, the contaminant buildup on a traditional contact sensor degrades performance of the contact sensor and leads to an early contact detect trigger. The split contact sensor 620 is configured to provide sensing of head-to-medium contact, BLIWP, and LLIWP while avoiding the contamination plume at the ABS 602 and concomitant contaminant buildup. As a result, the split contact sensor 620 produces a reliable contact detection signal indicative of actual (rather than early) head-to-medium contact.

According to various embodiments, the first and second ABS sections 622, 624 of the split contact sensor 620 are situated at or near a location of the ABS 602 outside of the contaminant buildup region 640. For example, the first ABS section 622 extends along the ABS 602 in a cross-track direction to a location adjacent to peripheral line 642 of the contaminant buildup region 640. At this location, denoted by a solid circle, the distal section 626 of the split contact sensor 620 extends away from the ABS 602 and into the body of the slider 600, thereby avoiding the contaminant buildup region 640 (see FIG. 6B). The distal section 626 extends in a cross-track direction within the body of the slider 600 and connects with the second ABS section 624 at a location adjacent the contaminant buildup region 640 (denoted by a solid circle). From this location adjacent the contaminant buildup region 640 denoted by a solid circle, the second ABS section 624 extends along the ABS 602 in a cross-track direction.

As can be seen in FIGS. 6A and 6B, the points of connection (denoted as solid circles) between the distal section 626 and the first and second ABS section 622, 624 of the split contact sensor 600 define a gap, G, at the ABS 602. The size, $S_2$, of the gap, G, is dependent on the width of the contaminant buildup region 640 at a location where the split contact sensor 600 is positioned at the ABS 602. Because the contaminant buildup region 640 has a tapered shape, the size, $S_2$, of the gap, G, is related to the apex angle, β, and the spacing, $S_1$ between the NFT 612 and the split contact sensor 620. Generally, the size, $S_2$, of the gap, G, ranges from about 2 μm to about 8 μm. In general, the split contact sensor 620 has an overall length, L, ranging from about 8 μm to about 20 μm.

In some embodiments, the slider 600 includes a structure 630 near the NFT/write pole region 614. For example, the writer of the slider 600 can include a yoke 630 which is in contact with, and magnetically coupled to, the write pole 610 (see, e.g., yoke 228 in FIG. 2). In some slider implementations, the yoke or other structure 630 can be in the same plane (or close to the same plane) as the split contact sensor 620. In such embodiments, the distal section 626 of the split contact sensor 620 can be positioned and shaped to extend around the periphery of at least a portion of the yoke or structure 630. As such, the shape of the distal section 626 of the split contact sensor 620 can conform to a shape of the periphery of the yoke or structure 630. The distal section 626 is spaced apart from the yoke or structure 630 to avoid shorting the split contact sensor 620. In some implementations, a dielectric material is disposed between the distal section 626 and the yoke or structure 630 to provide electrical isolation therebetween.

In some embodiments, the distal section 626 need not extend around and conform to the shape of the periphery of the yoke or structure 630. As is shown in FIG. 6C, a dielectric material 632 can be disposed between the distal section 626 and the yoke or structure 630 to provide electrical isolation between the distal section 626 and the yoke or structure 630. As such, the distal section 626 can traverse across the yoke or structure 630 rather than traversing around the periphery of the yoke or structure 630. In embodiments that include a yoke or other structure 630 that represents an obstruction to the distal section 626, the size, $S_2$, of the gap, G, of the split contact sensor 620 needs to be of sufficient size to accommodate the yoke or other structure 630. It is understood that the split contact sensor 620 can be implemented at locations of the ABS 620 other than the NFT/write pole region 614. For example, the split contact sensor 620 can be positioned down track of the NFT/write pole region 614 in a region that includes a bottom cladding disk (BCD) situated proximate an optical waveguide of the slider 600. The distal section 626 of the split contact sensor 620 can extend into the body of the slider 600 and loop around the BCD volume, while the first and second ABS sections 620 and 624 are situated at or near the ABS 602.

According to various embodiments, the split contact sensor 620 can be a thermal sensor having a temperature coefficient of resistance (referred to herein as a TCR sensor). The split contact sensor 620 can be or comprise, for example, a thin metallic element, such as a wire, having a high TCR. In some embodiments, the first and second ABS sections 620 and 624 comprise a material having a high TCR, and the distal section 626 comprises a material having a low TCR. The distal section 626 can be formed at the same time, and with the same low TCR material as, the leads that connect to the first and second ABS sections 620 and 624 (see, e.g., leads 1110, 1112 in FIG. 11). In other embodiments, the entire split contact sensor 620 can comprise the same high TCR material.

In some configurations, the split contact sensor 620 is implemented as a Differential-Ended Thermal Coefficient of Resistance (DETCR) sensor. A DETCR sensor is configured to operate with each of its two electrical contacts (i.e., ends) connected to respective bias sources provided by a pair of electrical bond pads of the slider 600. In other configurations, the split contact sensor 620 can be implemented as a ground-split temperature coefficient of resistance (GSTCR) sensor, in which one end of the GSTCR is coupled to ground and the other is coupled to a bias source via an electrical bond pad of the slider 600. It is understood that other types of contact sensors are contemplated, including various types of resistance thermal sensors, thermistors, and thermocouples, for example.

Figure 7:
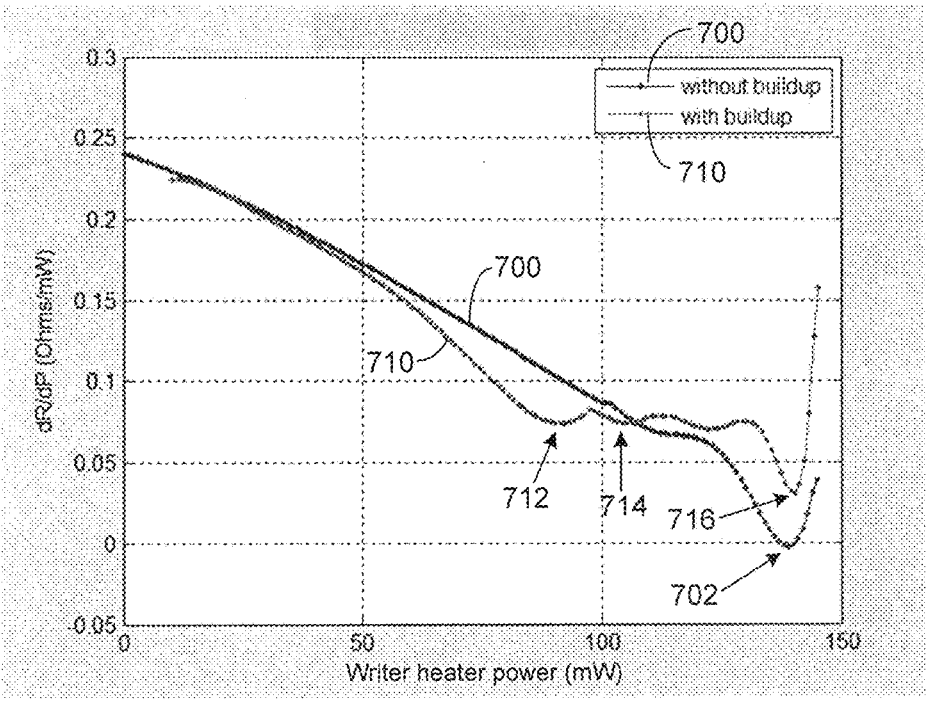
FIG. 7 shows contact sensor signals generated by a conventional contact sensor with and without contaminant buildup.

FIG. 7 shows contact sensor signals generated by a conventional contact sensor with and without contaminant buildup. The contact sensor signals are given in terms of dR/dP, where dR is a change in resistance of the contact sensor and dP is a change in heater power. It is highly desirable that a contact sensor signal have only a single, distinct low point indicative of a head-to-medium contact event. Curve 700 represents the contact sensor signal generated by the conventional contact sensor without contaminant buildup. As can be seen in FIG. 7, curve 700 decreases generally linearly with decreasing head-to-medium clearance. Detecting a deviation from linearity in dR/dP and a minima $(dR/dP_{MIN})$ 702 indicates head-media contact and head-media caused cooling and frictional heating. In practice, a detector of the HAMR device evaluates the dR/dP curve 700 to detect a minima of the curve 700, indicated by a $dR/dP_{MIN}$ 702 in FIG. 7. When the mimima 702 is detected, a head-to-medium contact event can be declared. As can be seen in FIG. 7, curve 700 includes a single, distinct low point 702 indicative of a head-to-medium contact event.

Curve 710 represents a contact sensor signal generated by the conventional contact sensor with contaminant buildup. As in the case with curve 700, curve 710 decreases generally linearly with decreasing head-to-medium clearance. Unlike curve 700, curve 710 includes more than one, distinct low point indicative of a head-to-medium contact event. Rather, curve 710 includes a first low point 712 which, when detected, can cause an early contact detect trigger and premature declaration of head-to-medium contact. Depending on the sensitivity of the contact detector, a second low point 714 of curve 710 may be detected as an early (and false) indication of head-to-medium contact. Curve 710 includes a third low point 716 which, when detected, is indicative of an actual head-to-medium contact event. Note the difference in dR/dP at point 716 of curve 710 relative to that at point 702 of curve 700. The higher value of dR/dP at point 716 of curve 710 it is due to the presence of contaminant buildup between the contact sensor and the magnetic medium, which gives a false indication of the heater power required to effect contact between the contact sensor (with no buildup) and the magnetic medium.

Figure 8:
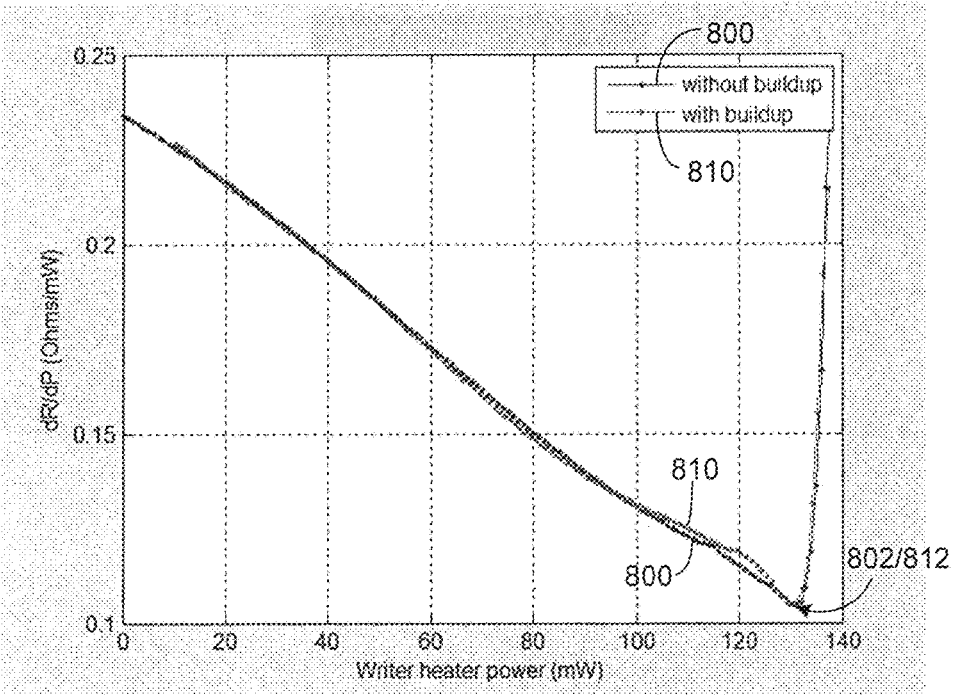
FIG. 8 shows contact sensor signals generated by a split contact sensor according to various embodiments with and without contaminant buildup.

FIG. 8 shows contact sensor signals generated by a split contact sensor according to various embodiments with and without contaminant buildup. Curve 800 represents the contact sensor signal generated by the split contact sensor without contaminant buildup. Curve 810 represents the contact sensor signal generated by the split contact sensor with contaminant buildup. As can be seen in FIG. 8, curves 800 and 810 are nearly identical, with each curve 800, 810 having a single, distinct low point 802/812. In fact, the location and magnitude of the low point 802 of curve 800 is effectively the same as the location and magnitude of the low point 812 of curve 810. Curves 800, 810 of FIG. 8 demonstrate that the split contact sensor of the present disclosure provides a reliable and consistent contact detect signal even with contaminant buildup occurring within the contaminant buildup region of the ABS.

Figure 9:
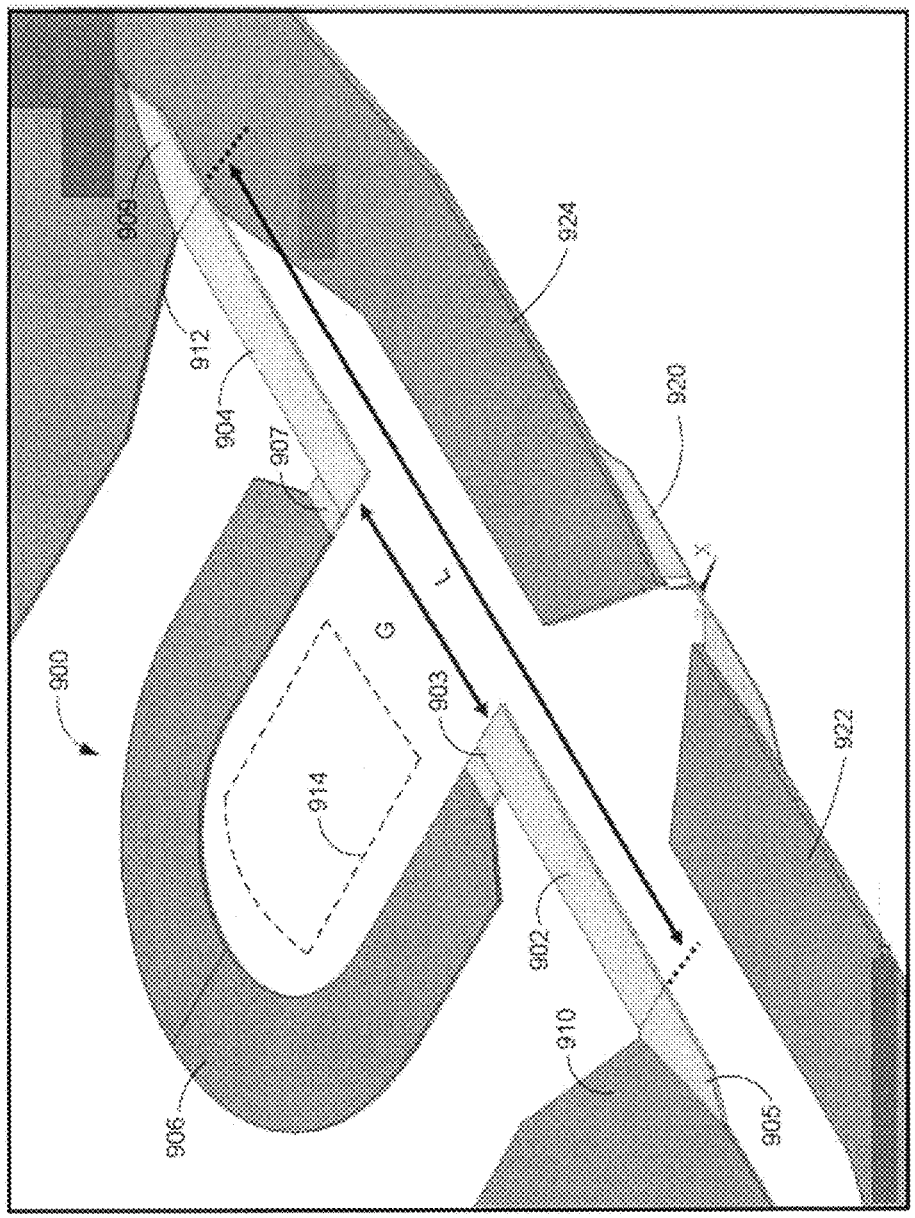
FIG. 9 is a perspective view of a split contact sensor in accordance with various embodiments.

FIG. 9 is a perspective view of a split contact sensor in accordance with various embodiments. The split contact sensor 900 is configured for deployment at a location of the slider proximate the NFT/write pole region of the ABS as previously described. The split contact sensor 900 includes a first ABS section 902, which is situated at or near the ABS of the slider at a location previously described. The split contact sensor 900 includes a second ABS section 904, which is situated at or near the ABS of a slider at a location previously described. A distal section 906 of the split contact sensor 900 is connected at a first end 903 of the first ABS section 902 and at a first end 907 of the second ABS section 904. The distal section 906 extends away from the ABS and into the body of the slider so as to avoid the contaminant buildup region of the ABS. The distal section 906 shown in FIG. 9 has the general shape of the letter U, the Greek letter Omega, or an open loop. In some embodiments, the shape of the distal section 906 generally conforms to a shape of a structure 914 of the slider (e.g., a yoke) that is on the same plane as the split contact sensor 900. It is understood that the distal section can have any practical or useful shape. A dielectric material (e.g., 200 nm of $Al_2O_3$) can be disposed between the distal section 906 and the structure 914 to provide electrical isolation between the distal section 906 and the structure 914.

The split contact sensor 900 includes a gap, G, defined along the ABS between respective first ends 903, 907 of the first and second ABS sections 902, 904. As was discussed previously, the gap, G, has a spacing sufficient to accommodate the width of the contamination plume developed within the contaminant buildup region of the ABS. In the embodiment shown in FIG. 9, the gap, G, has a spacing of about 6 μm (e.g., 5.8 μm), and the split contact sensor 900 has a length, L, of about 20 μm.

As is further shown in FIG. 9, a second end 905 of the first ABS section 902 is connected to a first electrical lead 910. A second end 909 of the second ABS section 904 is connected to a second electrical lead 912. The first and second electrical leads 910, 912 are coupled to a pair of electrical bond pads of the slider. Also shown in FIG. 9 is reader contact sensor 920, which is positioned up track of the split contact sensor 900 in the direction of the leading edge of the slider. The reader contact sensor 920 is connected to a pair of electrical leads 922, 924. The electrical leads 922, 924 are coupled to a pair of electrical bond pads of the slider. In some embodiments, the reader contact sensor 920 and the split contact sensor 900 are coupled together (e.g., in series or parallel) and to the same pair of electrical bond pads of the slider.

In some embodiments, the first and second ABS sections 902 and 904 comprise a material having a high TCR, and the distal section 906 comprises a material having a low TCR. The distal section 906 can be formed at the same time, and with the same low TCR material as, the leads 910 and 912 that connect to the first and second ABS section ends 905 and 909. In other embodiments, the distal section 906 is formed from the same material as that of the first and second ABS sections 902, 904. Materials having a relatively high TCR provide for enhanced temperature and temperature change sensing by the split contact sensor 900. Suitable materials include, but are not limited, metals such as Pt, Ru, Cu, Cr, Au, Al, W, Ni, NiFe, and Mo. Other non-metal materials may also be used, such as carbon nanotubes, indium tin oxide (ITO), Poly(3,4-ethylenedioxythiophene) (PEDOT), poly(styrene sulfonate) PSS, and graphene. Materials having a low TCR include Nichrome, constantan, manganin, and mercury.

In general, the TCR of the first and second ABS sections 902 and 904 (e.g., the sensor portion of the split contact sensor 900) is higher than the TCR of the leads 910 and 912. Preferably, the TCR of the first and second ABS sections 902 and 904 is above about 0.3%/° C., and the TCR of the leads 910 and 912 is less than about 0.1%/° C. Acceptable performance can be achieved when the TCR of the first and second ABS sections 902 and 904 is at least about 0.3%/° C., and the TCR of the leads 910 and 912 is about 0.2%/° C. or less.

Figure 10:
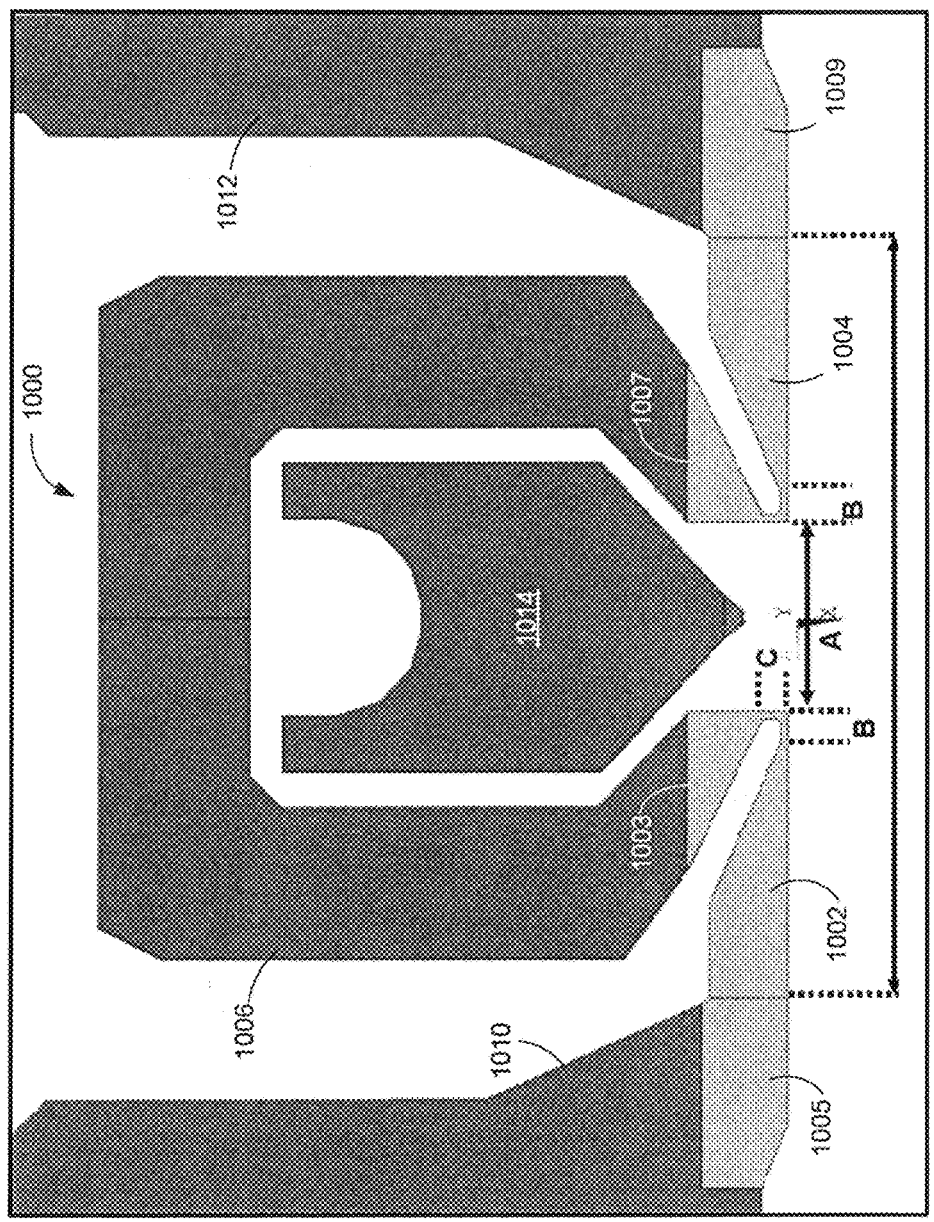
FIG. 10 is a cross-sectional view of a split contact sensor in accordance with various embodiments.

FIG. 10 is a view of a split contact sensor in accordance with various embodiments. The split contact sensor 1000, which was developed for modeling purposes, is configured for deployment at a location of the slider proximate the NFT/write pole region of the ABS as previously described. The split contact sensor 1000 includes a first ABS section 1002, which is situated at or near the ABS of the slider at a location previously described. The split contact sensor 1000 includes a second ABS section 1004, which is situated at or near the ABS of a slider at a location previously described. A distal section 1006 of the split contact sensor 1000 is connected at a first end 1003 of the first ABS section 1002 and at a first end 1007 of the second ABS section 1002. The distal section 1006 extends away from the ABS and into the body of the slider so as to avoid the contaminant buildup region of the ABS.

The distal section 1006 shown in FIG. 10 has the general shape of the letter U, the Greek letter Omega, or an open loop (in block form). In some embodiments, the shape of the distal section 1006 generally conforms to a shape of a structure 1014 of the slider (e.g., a yoke) which is on the same plane (or nearly the same plane) as the split contact sensor 1000. A dielectric material can be disposed in a gap (e.g., 0.5 μm in width) between the distal section 1006 and the structure 1014 to provide electrical isolation therebetween. The split contact sensor 1000 can be formed of materials described hereinabove.

As is further shown in FIG. 10, a second end 1005 of the first ABS section 1002 is connected to a first electrical lead 1010. A second end 1009 of the second ABS section 1004 is connected to a second electrical lead 1012. The first and second electrical leads 1010, 1012 are coupled to a pair of electrical bond pads of the slider. In some embodiments, the first and second ABS sections 1002 and 1004 comprise a material having a high TCR, and the distal section 1006 comprises a material having a low TCR. The distal section 1006 can be formed at the same time, and with the same low TCR material as, the leads 1010 and 1012 that connect to the first and second ABS section ends 1005 and 1009. In other embodiments, the distal section 1006 is formed from the same material as that of the first and second ABS sections 1002, 1004.

The split contact sensor 1000 includes a gap, A, defined along the ABS between respective first ends 1003, 1007 of the first and second ABS sections 1002, 1004. The gap, A, has a spacing sufficient to accommodate the width of the contamination plume developed within the contaminant buildup region of the ABS. In the embodiment shown in FIG. 10, the gap, A, has a spacing of between about 2 μm and 4 μm (e.g., 3 μm), and the split contact sensor 1000 has a length, D, of about 12 μm. In the design of the split contact sensor 1000, the lengths B and C (e.g., both 0.375 μm) at the respective first ends 1003, 1007 of the first and second ABS sections 1002, 1004 are matched to target a maximum active sensor resistance (e.g., ~39Ω). It is noted that the diagonal cutouts at the respective first ends 1003, 1007 of the first and second ABS sections 1002, 1004 have a width of 0.3 μm.

Figure 11:
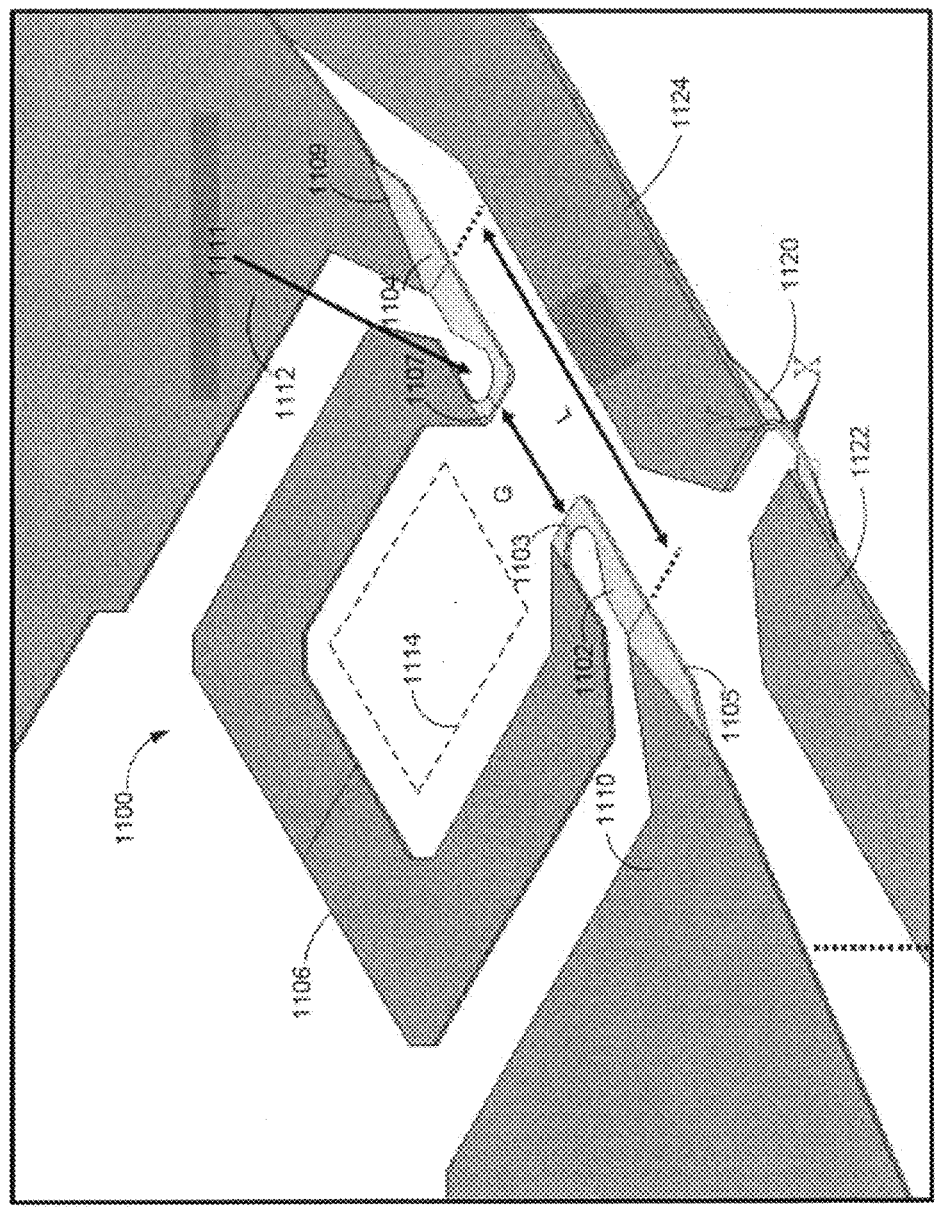
FIG. 11 is a perspective view of a split contact sensor in accordance with various embodiments.

FIG. 11 is a perspective view of a split contact sensor in accordance with various embodiments. Relative to the embodiments shown in FIGS. 9 and 10, the split contact sensor 1100 provides for increased process manufacturability and reduced cross-track separation between ABS sections of the split contact sensor 1100. The split contact sensor 1100 is configured for deployment at a location of the slider proximate the NFT/write pole region of the ABS as previously described. The split contact sensor 1100 includes a first ABS section 1102 and a second ABS section 1104, both of which are situated at or near the ABS of a slider at a location previously described. A distal section 1106 of the split contact sensor 1100 is connected at a first end 1103 of the first ABS section 1102 and at a first end 1107 of the second ABS section 1102. The distal section 1106 extends away from the ABS and into the body of the slider so as to avoid the contaminant buildup region of the ABS.

The distal section 1106 shown in FIG. 11 has the general shape of the letter U, the Greek letter Omega, or an open loop (in block form). In some embodiments, the shape of the distal section 1106 generally conforms to a shape of a structure 1114 of the slider (e.g., a yoke) which is on the same plane (or nearly the same plane) as the split contact sensor 1100. A dielectric material can be disposed in a gap between the distal section 1106 and the structure 1114 to provide electrical isolation therebetween.

As is further shown in FIG. 11, a second end 1105 of the first ABS section 1102 is connected to a first electrical lead 1110. A second end 1109 of the second ABS section 1104 is connected to a second electrical lead 1112. The first and second electrical leads 1110, 1112 are coupled to a pair of electrical bond pads of the slider. Also shown in FIG. 11 is reader contact sensor 1120, which is positioned down track of the split contact sensor 1100 in the direction of the leading edge of the slider. The reader contact sensor 1120 is connected to a pair of electrical leads 1122, 1124. The electrical leads 1122, 1124 are coupled to a pair of electrical bond pads of the slider. In some embodiments, the reader contact sensor 1120 and the split contact sensor 1100 are coupled together (e.g., in series or parallel) and to the same pair of electrical bond pads of the slider.

In some embodiments, the first and second ABS sections 1102 and 1104 comprise a material having a high TCR, and the distal section 1106 comprises a material having a low TCR. The distal section 1106 can be formed at the same time, and with the same low TCR material as, the leads 1110 and 1112 that connect to the first and second ABS section ends 1105 and 1109. In other embodiments, the distal section 1106 is formed from the same material as that of the first and second ABS sections 1102, 1104.

The split contact sensor 1100 includes a gap, G, defined along the ABS between respective first ends 1103, 1107 of the first and second ABS sections 1102, 1104. The gap, G, has a spacing sufficient to accommodate the width of the contamination plume developed within the contaminant buildup region of the ABS. In the embodiment shown in FIG. 11, the gap, G, has a spacing of between about 2 µm and 4 µm (e.g., 3 µm), and the split contact sensor 1100 has a length, L, of about 9 µm (e.g., 8.8 µm). It is noted that the arcuate cutouts 1111 at the respective first ends 1103, 1107 of the first and second ABS sections 1102, 1104 have a diameter of 1 µm.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An apparatus, comprising:
   a slider comprising an air bearing surface (ABS), a leading edge, and a trailing edge opposing the leading edge;
   a writer having a write pole situated at or near the ABS;
   a near-field transducer (NFT) situated at or near the ABS and between the write pole and the leading edge of the slider,
   an optical waveguide configured to couple light from a laser source to the NFT;
   a contaminant buildup region at and near the NFT and the write pole; and
   a contact sensor situated between the write pole and the trailing edge, the contact sensor comprising:
     a first ABS section situated at or near the ABS;
     a second ABS section situated at or near the ABS and spaced apart from the first ABS in a cross-track direction by a gap sufficient in size to accommodate a width of the contaminant buildup region; and
     a distal section extending away from the ABS and connecting the first ABS section with the second ABS section.

2. The apparatus of claim 1, wherein:
   the first ABS section, the second ABS section, and the NFT are oriented along a first plane at or parallel with the ABS; and the distal section is oriented along a second plane oblique to the first plane.

3. The apparatus of claim 1, wherein:
a structural element of the slider is disposed in the gap between the first and second ABS sections; and
the distal section of the contact sensor wraps at least partially around the structural element.

4. The apparatus of claim 3, wherein the structural element comprises a magnetic structure of the writer.

5. The apparatus of claim 3, wherein the structural element comprises a yoke of the writer.

6. The apparatus of claim 3, comprising a dielectric material disposed between at least the distal section of the contact sensor and the structural element.

7. The apparatus of claim 1, wherein the gap has a spacing ranging from about 2 μm to about 8 μm.

8. The apparatus of claim 1, wherein the contact sensor has a length defined along the ABS ranging from about 8 μm to about 20 μm.

9. The apparatus of claim 1, wherein:
an angle is defined between the NFT and opposing ends of the first and second ABS sections; and
the angle ranges from about 15 degrees to about 30 degrees.

10. The apparatus of claim 1, wherein the contact sensor is configured to sense head-medium contact, Broad Laser-induced Writer Protrusion (BLIWP), and Local Laser-induced Writer Protrusion (LLIWP).

11. An apparatus, comprising:
a slider comprising an air bearing surface (ABS), a leading edge, and a trailing edge opposing the leading edge;
a writer having a write pole situated at or near the ABS;
a near-field transducer (NFT) situated at or near the ABS and between the write pole and the leading edge of the slider,
an optical waveguide configured to couple light from a laser source to the NFT;
a contaminant buildup region that fans out from the NFT in a cross-track direction along the ABS, past the write pole, and towards the trailing edge of the slider; and
a contact sensor situated between the write pole and the trailing edge, the contact sensor comprising:
a first ABS section situated at or near the ABS;
a second ABS section situated at or near the ABS and spaced apart from the first ABS in a cross-track direction by a gap; and
a distal section extending away from the ABS and connecting the first ABS section with the second ABS section;
wherein the gap is sufficient in size such that the first and second ABS sections are outside of the contaminant buildup region.

12. The apparatus of claim 11, wherein:
the first ABS section, the second ABS section, and the NFT are oriented along a first plane at or parallel with the ABS; and
the distal section is oriented along a second plane oblique to the first plane.

13. The apparatus of claim 11, wherein:
a structural element of the slider is disposed in the gap between the first and second ABS sections; and
the distal section of the contact sensor wraps at least partially around the structural element.

14. The apparatus of claim 13, wherein the structural element comprises a magnetic structure of the writer.

15. The apparatus of claim 13, wherein the structural element comprises a yoke of the writer.

16. The apparatus of claim 13, comprising a dielectric material disposed between at least the distal section of the contact sensor and the structural element.

17. The apparatus of claim 11, wherein the gap has a spacing ranging from about 2 μm to about 8 μm.

18. The apparatus of claim 11, wherein the contact sensor has a length defined along the ABS ranging from about 8 μm to about 20 μm.

19. The apparatus of claim 11, wherein:
the contaminant buildup region is defined by an angle formed between the NFT and opposing ends of the first and second ABS sections; and
the angle ranges from about 15 degrees to about 30 degrees.

20. The apparatus of claim 11, wherein the contact sensor is configured to sense head-medium contact, Broad Laser-induced Writer Protrusion (BLIWP), and Local Laser-induced Writer Protrusion (LLIWP).

* * * * *